(12) United States Patent
Nagashima et al.

(10) Patent No.: US 8,797,362 B2
(45) Date of Patent: Aug. 5, 2014

(54) ROTARY INPUT DEVICE AND ELECTRONIC EQUIPMENT

(75) Inventors: Kenji Nagashima, Daito (JP); Hirono Tsubota, Daito (JP); Takahiko Suzuki, Okaya (JP); Nobuyuki Sako, Okaya (JP); Takeshi Kodaira, Okaya (JP)

(73) Assignees: Pro-Tech Design Corporation, Okaya-shi (JP); Fukoku Co., Ltd., Ageo-shi (JP)

( * ) Notice: Subject to any disclaimer, the term of this patent is extended or adjusted under 35 U.S.C. 154(b) by 729 days.

(21) Appl. No.: 12/764,670

(22) Filed: Apr. 21, 2010

(65) Prior Publication Data

US 2010/0271402 A1 Oct. 28, 2010

(30) Foreign Application Priority Data

Apr. 22, 2009 (JP) ................................. 2009-104034

(51) Int. Cl.
*G09G 5/00* (2006.01)
(52) U.S. Cl.
USPC .......................................... 345/660; 345/156
(58) Field of Classification Search
None
See application file for complete search history.

(56) References Cited

U.S. PATENT DOCUMENTS

| | | | |
|---|---|---|---|
| 5,825,308 A | 10/1998 | Rosenberg | |
| 6,281,881 B1 | 8/2001 | Siddiqui et al. | |
| 2002/0030665 A1* | 3/2002 | Ano | 345/168 |
| 2007/0236450 A1* | 10/2007 | Colgate et al. | 345/156 |
| 2007/0279394 A1* | 12/2007 | Lampell et al. | 345/173 |
| 2008/0041671 A1* | 2/2008 | Anastas et al. | 188/161 |
| 2008/0055241 A1* | 3/2008 | Goldenberg et al. | 345/156 |
| 2009/0023478 A1 | 1/2009 | Lowles et al. | |
| 2011/0032203 A1* | 2/2011 | Pryor | 345/173 |

FOREIGN PATENT DOCUMENTS

| | | |
|---|---|---|
| JP | 11-312050 A | 11/1999 |
| JP | 2003-296006 A | 10/2003 |
| JP | 2006-211542 A | 8/2006 |

OTHER PUBLICATIONS

European Search Report dated Jan. 4, 2013 (8 pgs.).

* cited by examiner

*Primary Examiner* — Daniel Hajnik
(74) *Attorney, Agent, or Firm* — Crowell & Moring LLP

(57) ABSTRACT

Disclosed is a rotary input device including: a rotary operation device; a rotation driving section; a detection section; a force sense presenting section to present a force sense by a combination of at least two of applying the rotary force in a clockwise direction, applying the rotary force in a counter-clockwise direction, and stopping applying the rotary force; a display control section; a magnification ratio change instructing section; and a scroll instructing section, wherein the magnification ratio change instructing section instructs enlargement when rotating in one side, and instructs reduction when rotating in the other side; the scroll instructing section instructs on the basis of the depressed position; and the force sense presenting section changes a way of presenting the force sense in order that the operator can perceive a display state pertaining to a display position or a display magnification ratio of the image under display distinguishably.

8 Claims, 11 Drawing Sheets

ROTARY INPUT DEVICE AND ELECTRONIC EQUIPMENT

BACKGROUND OF THE INVENTION

1. Field of the Invention

The present invention relates to a rotary input device and electronic equipment equipped with the rotary input device.

2. Description of Related Art

A rotary input device has hitherto been known as an operation input device for operating electronic equipment, which rotary input device is equipped with a rotary operation device, such as a dial, to enable an operator to perform the enlargement and reduction of an image displayed in a display section in accordance with a rotation operation of the rotary operation device by an operator, and to scroll an image displayed in the display section in accordance with a depression operation of the rotary operation device by the operator (see, for example, Japanese Patent Application Laid-Open Publications No. 2003-296006, No. 2006-211542, and No. H11-312050).

As such a rotary input device, for example, the rotary input device described in Japanese Patent Application Laid-Open Publication No. 2006-211542 is provided with a plurality of clicking feeling grooves, or clicking feeling projections, arranged along a circumference around the rotation center of a rotary operation device at a constant angle pitch on one side of the rotary operation device and a member on the supporting side of the rotary operation device. The rotary input device is further provided with one or a plurality of clicking feeling projections, or clicking feeling grooves, which is freely fit to the clicking feeling grooves, or clicking feeling projections, to allow the rotations of the rotary operation device with a resistance to the rotations, on the other side of the rotary operation device and the member. The rotary input device aims to present a clicking feeling to an operator.

However, only providing the plurality of clicking feeling grooves and the clicking feeling projections arranged along a circumference around the rotation center of the rotary operation device at the constant angle pitch can only give the operator a fixed clicking feeling at a fixed position. Consequently, it is impossible to give the operator, for example, a clicking feeling according to a display state pertaining to the display position, the display magnification ratio, and the like of an image under display, and the operator is required to view the image in order to recognize the display state of the image under display.

SUMMARY OF THE INVENTION

It is an object of the present invention to provide a rotary input device capable of making an operator intuitively recognize the display state of an image under display and electronic equipment equipped with the rotary input device.

According to a first aspect of the invention, there is provided a rotary input device, including: a rotary operation device rotatable around a shaft by receiving a rotation operation of an operator; a rotation driving section to apply the rotary operation device a rotary force; a detection section to detect a depression of the rotary operation device in an axial direction; a force sense presenting section to present the operator a force sense by a combination of at least any two of applying the rotary force in a clockwise direction to the rotary operation device by the rotation driving section, applying the rotary force in a counterclockwise direction, and stopping applying the rotary force; a display control section to make a display section display a predetermined image; a magnification ratio change instructing section to instruct the display section to change a display magnification ratio of an image under display; and a scroll instructing section to instruct the display control section to scroll the image under display, wherein the magnification ratio change instructing section instructs enlargement of the image under display when the rotary operation device rotates in any one side of the clockwise direction and the counterclockwise direction, and instructs reduction of the image under display when the rotary operation device rotates in the other side; the detection section can detect a depressed position of the rotary operation device; the scroll instructing section instructs a scrolling direction of the image under display on the basis of the depressed position of the rotary operation device detected by the detection section; and the force sense presenting section changes a way of presenting the force sense in order that the operator can perceive a display state pertaining to a display position or a display magnification ratio of the image under display distinguishably.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

In the following, an embodiment of the present invention will be described in detail by reference to the accompanying drawings. Incidentally, the scope of the present invention is not limited to the shown examples.

In the present embodiment, it is intended to describe the present embodiment by illustrating a cellular phone handset performing verbal communication by wireless communication as electronic equipment equipped with a rotary input device according to the present invention.

Incidentally, in the following description, it is supposed that the side on which a rotary input device 10 and a display panel 331 of a display section 33 are arranged is treated as the front side, and the side opposed to the side on which the rotary input device 10 and the display panel 331 are arrange is treated as the back side in a cellular phone handset 1 of the present embodiment. Then, the side on which the display panel 331 is arranged is treated as the top side; the side on which the rotary input device 10 is arranged is treated as the bottom side; and the direction perpendicular to both of the front-back direction and the top-bottom direction is treated as the left-right direction.

Figure 1:
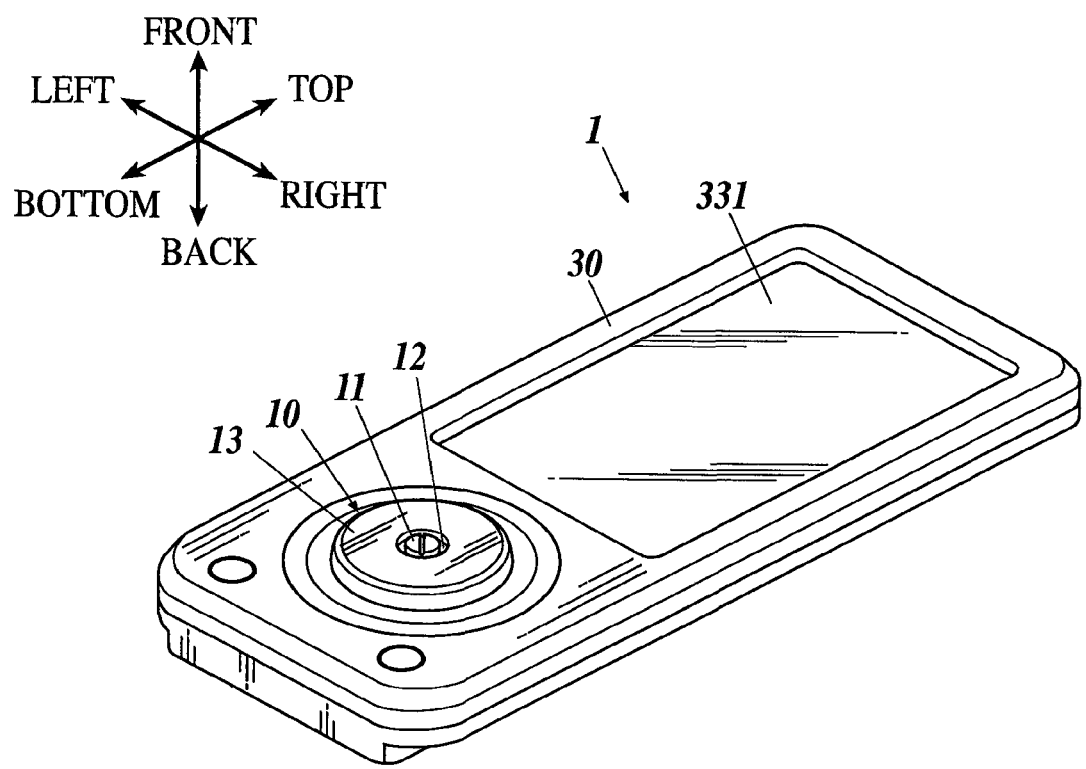
FIG. 1 is a perspective view of a cellular phone handset equipped with a rotary input device of an embodiment to which the present invention is applied.
Figure 2:
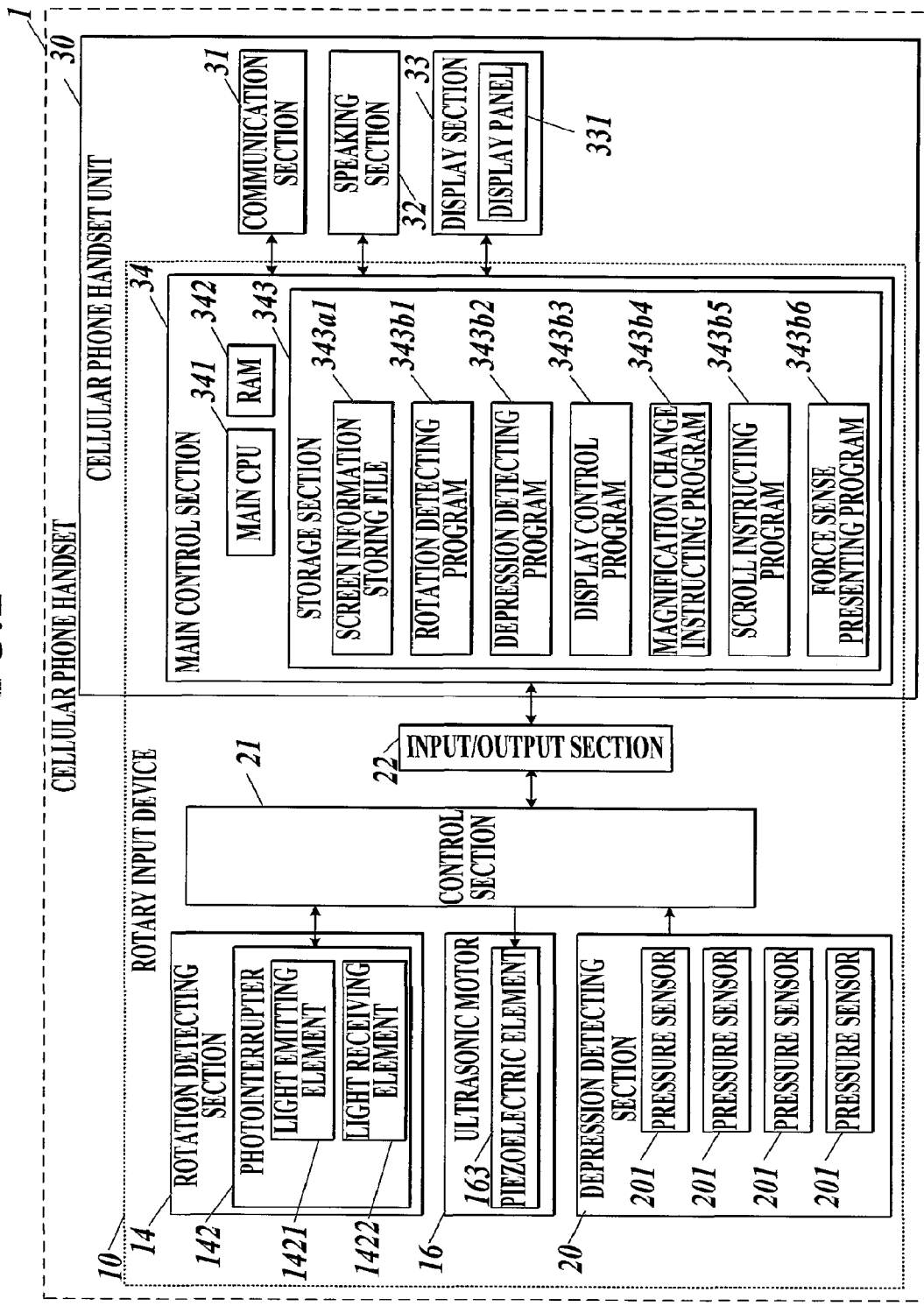
FIG. 2 is a block diagram showing the functional configuration of the cellular phone handset of the present embodiment.
Figure 3:
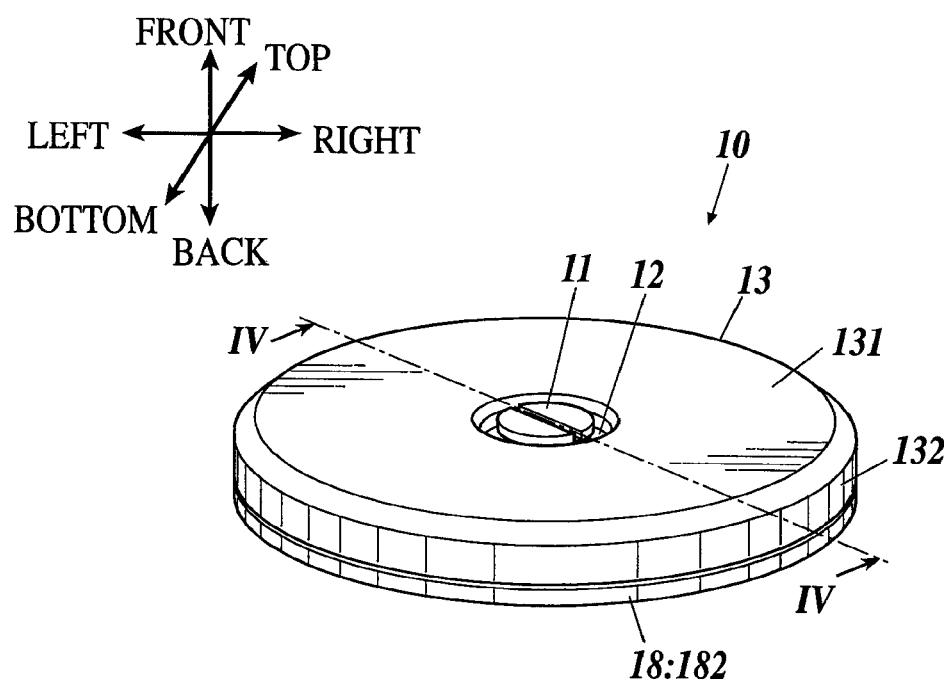
FIG. 3 is a perspective view of the external appearance of the rotary input device of the present embodiment.
Figure 4:
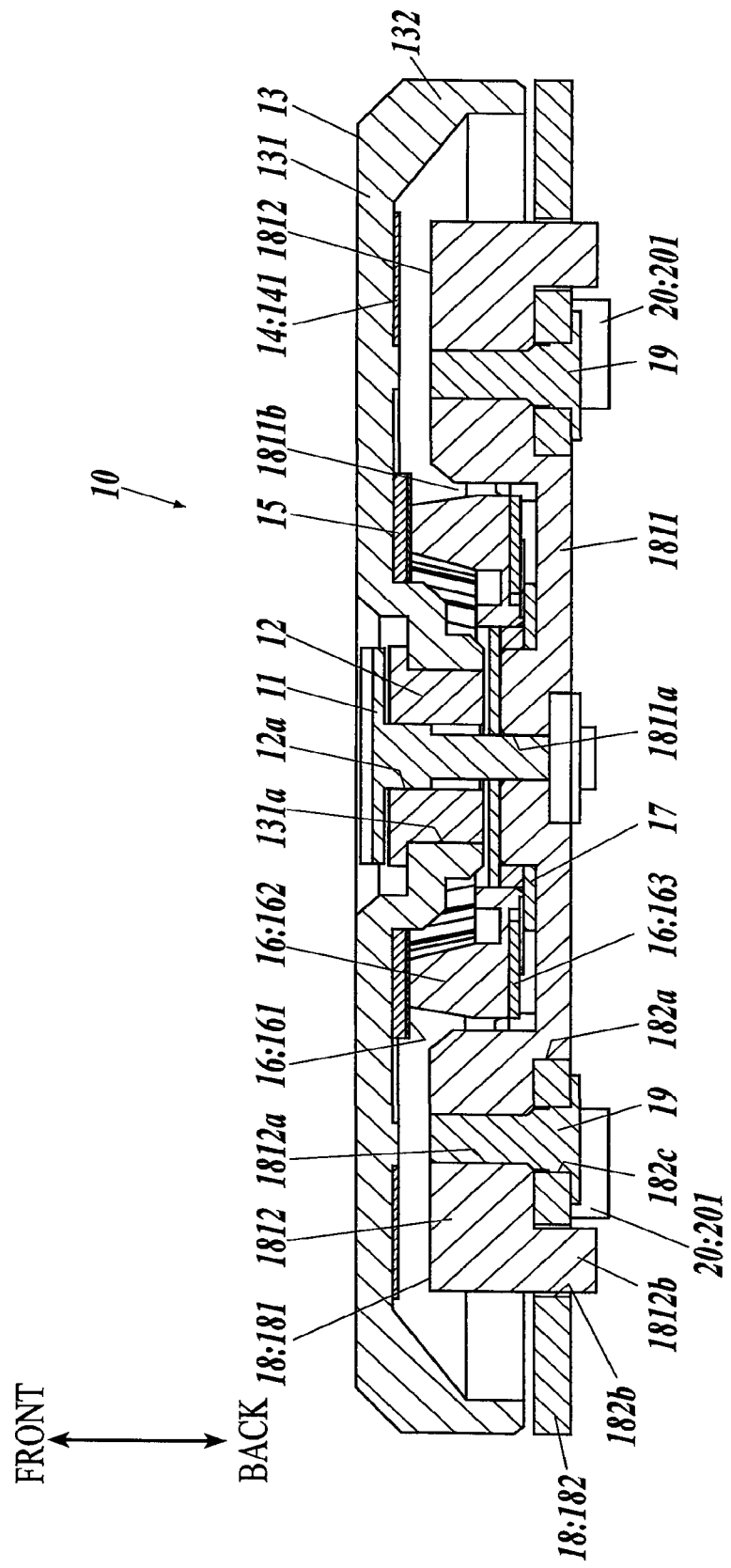
FIG. 4 is a sectional view taken along a line IV-IV in FIG. 3.
Figure 5:
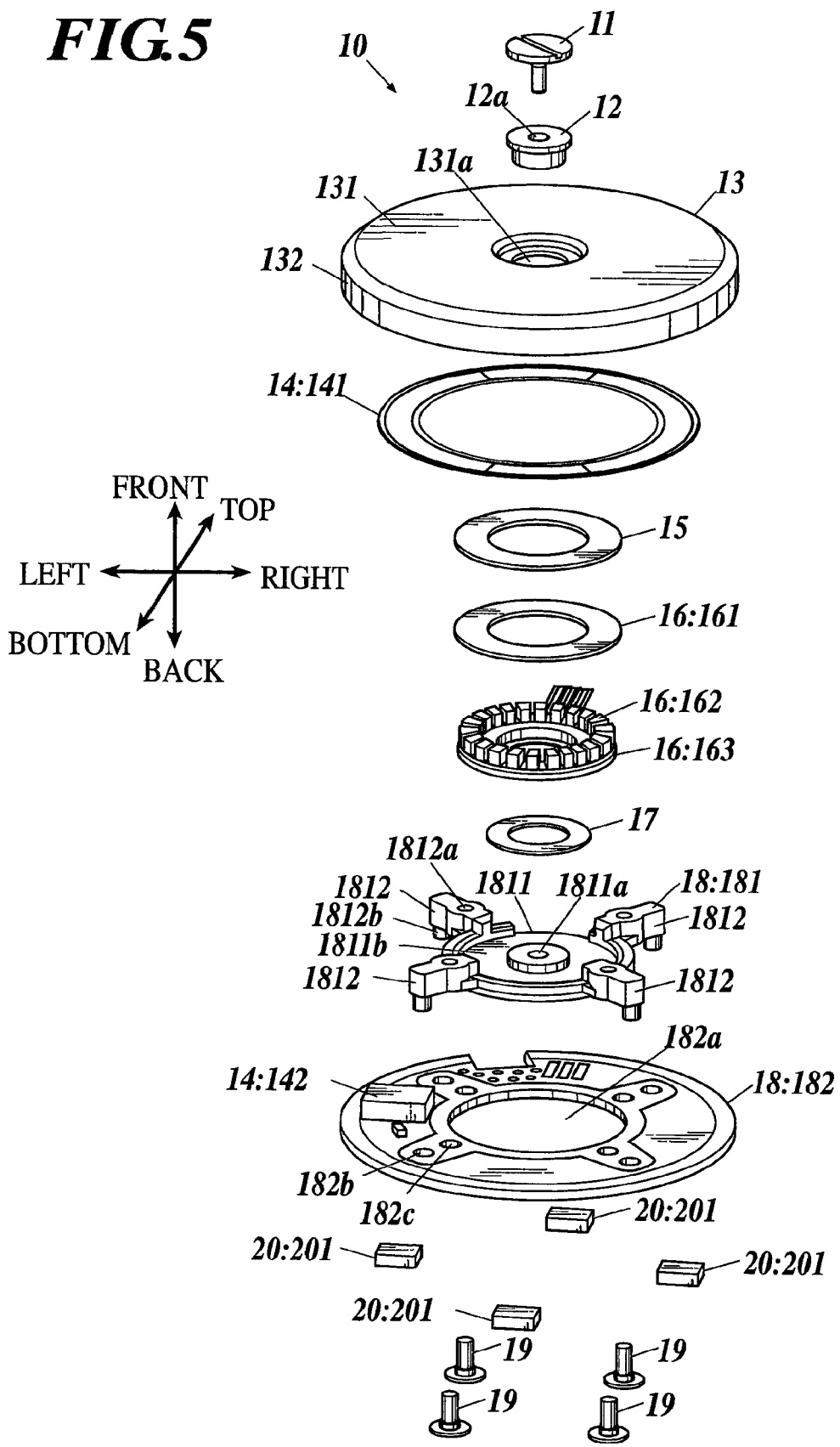
FIG. 5 is an exploded view of the rotary input device of the present embodiment.

The cellular phone handset 1 is composed to include, for example, as shown in FIGS. 1 and 2, the rotary input device 10 for an input operation by an operator, and a cellular phone handset unit 30 operated by the rotary input device 10.

(Rotary Input Device)

First, the rotary input device 10 of the present embodiment is described.

The rotary input device 10 is equipped with, for example, as shown in FIGS. 2-5, a rotary operation device 13, which an operator can manually rotate, and a supporting stand 18, which is provided on the back side of the rotary operation device 13 to support the rotary operation device 13 rotatably. The whole shape of the rotary input device 10 is formed in an almost a disk shape.

The rotary operation device 13 is equipped with a circular front surface section 131 including an aperture section 131*a* at the center thereof, and a circumferential surface section 132 projecting from the edge portion of the front surface section 131 to the back over the whole circumference. The rotary operation device 13 is provided at a position to cover the front side of the supporting stand 18, and consequently the front surface section 131 and the circumferential surface section 132 are form the front surface and the circumferential surface of the rotary input device 10, respectively.

The front surface section 131 forms the operation surface for a rotation operation by an operator, and the operator performs an input operation in the cellular phone handset unit 30 by rotating the rotary operation device 13 while pressing down a point the front surface section 131 with a fingertip or while pinching the circumferential surface section 132.

The rotary operation device 13 may be formed of, for example, a material having a radiation performance, such as aluminum, or a material having a strong resistance property to an impact from the outside, alternatively may be formed of a resin or the like.

The supporting stand 18 is equipped with a base 181 and a polychlorinated biphenyl (PCB) substrate 182 connected to the base 181. By providing the supporting stand 18 at a position to cover the an aperture on the back side of the rotary operation device 13, the supporting stand 18 forms the back surface of the rotary input device 10.

The base 181 is equipped with an almost doughnut disk-like pedestal section 1811 having an aperture at the center thereof and four extension sections 1812 extending toward the outside from the peripheral portion of the pedestal section 1811.

Each of the extension sections 1812 is provided with a threaded hole 1812*a* for attaching a screw and a projection 1812*b* formed on the back surface further outward than the threaded hole 1812*a* to extend toward the rear.

The base 181 is made of a material, such as polycarbonate.

The PCB substrate 182 is formed in a tabular ring having almost the same outer diameter as that of the rotary operation device 13, and the pedestal section 1811 of the base 181 is fit in an aperture section 182*a* at almost the center of the PCB substrate 182. Moreover, the PCB substrate 182 is provided with four attaching holes 182*b* for attaching the projections 1812*b* provided on the back surface of each of the extension sections 1812 of the base 181 to project backward are formed in the PCB substrate 182 correspondingly to the projections 1812*b*, respectively. Then, the PCB substrate 182 and the base 181 are integrally connected to each other by attaching the pedestal section 1811 of the base 181 to the aperture section 182*a* of the PCB substrate 182, and by fitting the projections 1812*b* of the base 181 in the attaching holes 182*b* of the PCB substrate 182, respectively.

Moreover, four hole sections 182*c*, each having a diameter slightly larger than that of each of the threaded holes 1812*a* of the base 181, are formed in the PCB substrate 182 at positions overlapping the threaded holes 1812*a*, respectively, correspondingly to the threaded holes 1812*a*, respectively. A screw 19 is screwed from the back side of the PCB substrate 182 in each of the threaded holes 1812*a* of the base 181 through each of the hole sections 182*c* of the PCB substrate 182, and thereby the PCB substrate 182 and the base 181 are fixed to each other.

Furthermore, a bearing 12 is provided to be arranged on the inner circumferential surface of the aperture section 131*a* of the front surface section 131 with which the rotary operation device 13 is equipped, a screw 11 to function as a rotation shaft of the rotary operation device 13 is inserted in a through-hole 12*a* at the center of the bearing 12. Then, the screw 11 and the supporting stand 18 are fix to each other by inserting the screw 11 in the through-hole 12*a* of the bearing 12 from the front side of the rotary operation device 13 and further by screwing the back end part of the screw 11 projecting backward in the female screw formed on the inner circumferential surface of the aperture 1811*a* at the center of the pedestal section 1811 with which the base 181 is equipped. Hereby, the rotary operation device 13 is connected to the supporting stand 18 rotatably around the screw 11.

Moreover, a space is formed between the rotary operation device 13 and the supporting stand 18, and the space contains a rotation detecting section 14 detecting a rotation angle of the rotary operation device 13, an ultrasonic motor 16 as a rotation driving section to rotate the rotary operation device 13, a depression detecting section 20 detecting the depression of the rotary operation device 13 in the axial direction (front-back direction), a control section 21 performing the integrated control of the rotary input device 10, an input/output section 22 performing the transmission and the reception of various signals with the cellular phone handset unit 30, and the like, in an arranged state.

The rotation detecting section 14 is composed of, for example, a ring-like code wheel 141, and a photointerrupter 142 detecting the rotation angle displacement of the code wheel 141.

The code wheel 141 is fixated onto the inner surface (back surface) of the front surface section 131, with which the rotary operation device 13 is equipped, in the state in which the center of the code wheel 141 agrees with the center of the rotary operation device 13, and the code wheel 141 rotates in conjunction with the rotary operation device 13. A light reflecting surface is printed on the back surface of the code wheel 141 at a predetermined pitch of two detection patterns of an A phase and a B phase along a circumferential direction.

The photointerrupter 142 is a reflection type photointerrupter composed of a light emitting element 1421, such as a light emitting diode (LED), and a light receiving element 1422, such as a photo integrated circuit (IC). The photointerrupter 142 is mounted at a position opposed to the code wheel 141 on the front surface of the PCB substrate 182, and is connected to the control section 21.

The light receiving element 1422 includes at least two light receiving surfaces and is configured to output the detection signals of the A phase and the B phase, which differs from each other by 90 degrees.

The photointerrupter 142 receives the reflection light of a light emitted from the light emitting element 1421 toward the code wheel 141 with the light receiving element 1422, and counts the reflection light. Thereby, the photointerrupter 142 detects the rotation quantity and the rotation direction of the rotary operation device 13, and outputs the detection results to the control section 21. The control section 21 outputs the detection results from the photointerrupter 142 to the cellular phone handset unit 30 through the input/output section 22, and then the cellular phone handset unit 30 specifies the rotation angle of the rotary operation device 13 on the basis of the detection results.

The ultrasonic motor 16 is composed of, for example, a piezoelectric element 163, a ring-like stator (vibrating body) 162 and a rotor 161 touching the front surface of the stator 162. The ultrasonic motor 16 drives the rotary operation device 13 in accordance with a control signal from the control section 21 to rotate the rotary operation device 13 around the shaft thereof.

The stator 162 is fit in a ring-like concave portion 1811b formed on the front surface of the pedestal section 1811 with which the base 181 is equipped, and is fixed to the base 181 with a tabular ring-like double-coated adhesive tape 17.

The stator 162 is equipped with a plurality of convex parts provided to be arranged along the circumferential direction of the stator 162 at the front part thereof, and the stator 162 is equipped with the plurality of piezoelectric elements 163, which generates vibrational energy in response to an application of a drive voltage based on a drive signal and is arranged along the circumferential direction of the stator 162 on the back surface thereof.

The rotor 161 is made of a material, such as high-molecular polyethylene, and has a tabular ring-like shape.

The rotor 161 is provided to be arranged at a position sandwiched between the stator 162 and the rotary operation device 13 on the inner circumference side of the code wheel 141, and is fixed to the rotary operation device 13 with a tabular ring-like double-coated adhesive tape 15 in the state of being arranged so that the center of the rotor 161 agrees with are the center of the rotary operation device 13. The rotor 161 rotates in conjunction with the rotary operation device 13. That is, the front surface of the rotor 161 is adhered to the back surface of the double-coated adhesive tape 15 adhered on the back surface of the front surface section 131, with which the rotary operation device 13 is equipped, and the back surface of the rotor 161 is touched to the convex parts of the stator 162. The back surface of the rotor 161 is made to have a high friction coefficient, and is configured to rotate in the counter direction to the direction of a progressive wave produced by a vibration of the stator 162 touched to the back surface.

The piezoelectric element 163 is connected to the control section 21. When a predetermined drive voltage is applied from the control section 21 to the piezoelectric element 163, the whole body of the stator 162 is vibrated by a ultrasonic vibration of the piezoelectric element 163, and the progressive wave is transmitted to the rotor 161. By this, the rotor 161 rotates. Then, the rotary input device 10 is configured to rotate the rotary operation device 13 by the transmission of the rotary force of the rotor 161 to the rotary operation device 13. Furthermore, the rotary input device 10 is configured to be able to freely set the magnitude and the rotation direction of the rotary force of the rotary operation device 13 caused by the ultrasonic vibration of the piezoelectric element 163 by controlling the drive frequency of the drive voltage applied to the piezoelectric element 163.

The depression detecting section 20 is equipped with four pressure sensors 201 fixated at four positions on the top side, bottom side, left side, and right side of the back surface of the PCB substrate 182, respectively, and the depression detecting section 20 is connected to the control section 21.

The depression detecting section 20 detects a depression of the rotary operation device 13 in the axial direction (front-back direction) thereof with each of the pressure sensors 201 to output the detection results to the control section 21. The control section 21 outputs the detection results from the depression detecting section 20 to the cellular phone handset unit 30 through the input/output section 22, and the cellular phone handset unit 30 specifies the depressed position of the rotary operation device 13 and the depression force at the time of the depression of the rotary operation device 13 on the basis of the detection results.

As the pressure sensors 201, for example, a resistive film type pressure sensor, a diffusion type one, a film formation type one, an electrical capacitance type one, and a mechanical type one can be used.

The control section 21 is configured to include, for example, a central processing unit (CPU), a random access memory (RAM), and a storage section.

The control section 21 is connected to the cellular phone handset unit 30 through the input/output section 22. The control section 21 performs the centralized control, of the operation of each section constituting the rotary input device 10 in accordance with a control signal input from the cellular phone handset unit 30, and outputs a signal input from each section constituting the rotary input device 10 to the cellular phone handset unit 30.

To put it concretely, the control section 21 is connected to the photointerrupter 142 of the rotation detecting section 14. The control section 21 instructs the light emitting element 1421 of the photointerrupter 142 to emit a light in accordance with a control signal input from the cellar phone handset 30 through the input/output section 22, and outputs a detection signal, input from the light receiving element 1422 of the photointerrupter 142, as a detection result to the cellular phone handset unit 30 through the input/output section 22. Hereby, the cellular phone handset unit 30 specifies a rotation angle of the rotary operation device 13.

Moreover, the control section 21 is connected to the ultrasonic motor 16, and outputs a predetermined drive signal to the piezoelectric element 163 of the ultrasonic motor 16 in accordance with a control signal input from the cellular phone handset unit 30 through the input/output section 22. Hereby, the rotary operation device 13 rotates around the shaft thereof.

Moreover, the control section 21 is connected to the depression detecting section 20, and outputs a detection signal as the detection results input from the respective pressure sensors 201 of the depression detecting section 20 to the cellular phone handset unit 30 through the input/output section 22. Hereby, the cellular phone handset unit 30 can specify the depressed position of the rotary operation device 13 and the depression force at the time of the depression of the rotary operation device 13.

The input/output section 22 is connected to the main control section 34 of the cellular phone handset unit 30. The input/output section 22 sometimes outputs a control signal input from the main control section 34 to the control section 21, and sometimes outputs a signal input from the control section 21 to the main control section 34.

(Cellular Phone Handset Unit)

Next, the cellular phone handset unit 30 of the present embodiment will be described.

The cellular phone handset unit 30 is configured to be equipped with, for example, as shown in FIG. 2, a communication section 31, which is equipped with an antenna to perform the transmission and the reception of a wireless signal with external equipment, a speaking section 32, which is equipped with a speaker and a microphone to perform the input and the output of a sound, the display section 33, which is equipped with the display panel 331 and displays various screens on the display panel 331, and the main control section 34 performing the integrated control of the cellular phone handset 1.

Incidentally, because publicly known techniques are used for the communication section 31 and the speaking section 32 for realizing the verbal communication function with the external equipment by using wireless signals, the details of the communication section 31 and the speaking section 32 are omitted.

The display section 33 is configured to be equipped with, for example, the display panel 331, such as a liquid crystal display (LCD) panel, and performs given display processing in accordance with a control signal input from the main control section 34.

The main control section 34 is configured to be equipped with, for example, as shown in FIG. 2, a main CPU 341, a RAM 342, and a storage section 343.

The main CPU 341 performs, for example, various control operation in accordance with various processing programs, which are stored in the storage section 343 and are for the use of the cellular phone handset 1.

The RAM 342 is equipped with, for example, a program storing region for expanding a processing program to be executed by the main CPU 341, and a data storing region for storing input data and a processing result produced at the time of the execution of the processing program.

The storage section 343 stores, for example, a system program executable in the cellular phone handset 1, various processing programs executable on the system program, data to be used at the time of executing these various processing programs, and data of a processing result of operation processing by the main CPU 341. Incidentally, the programs are stored in the storage section 343 in the form of computer-readable program codes.

To put it concretely, the storage section 343 stores, for example, as shown in FIG. 2, an image information storing file 343a1, a rotation detecting program 343b1, a depression detecting program 343b2, a display control program 343b3, a magnification ratio change instructing program 343b4, a scroll instructing program 343b5, and a force sense presenting program 343b6.

The image information storing file 343a1 stores, for example, image information obtained by the functions (such as the camera function of imaging a subject to obtain the image information thereof and the downloading function of obtaining image information by communicating with a Web server) with which functions the cellular phone handset 1 is equipped.

The rotation detecting program 343b1 enables the CPU main 341 to realize the function of calculating a rotation angle of the rotary operation device 13 on the basis of a detection result by the rotation detecting section 14, which detection result is input from the control section through the input/output section 22.

To put it concretely, the main CPU 341 sets the rotation angle of the rotary operation device 13 at, for example, the time point when the display state of an image displayed on the display panel 331 of the display section 33 is switched to the initial state as "0 degree." When the rotary operation device 13 has rotated by 90 degrees from the time point in the clockwise direction, the main CPU 341 calculates the rotation angle of the rotary operation device 13 as "+90 degrees." When the rotary operation device 13 has rotated by 90 degrees from the time point in the counterclockwise direction, the main CPU 341 calculates the rotation angle of the rotary operation device 13 as "−90 degrees." Moreover, when the rotary operation device 13 has rotated by 90 degrees from the time point in the clockwise direction and rotated by 20 degrees in the counterclockwise direction, the main CPU 341 calculates the rotation angle of the rotary operation device 13 as "+70 degrees."

The depression detecting program 343b2 enables the main CPU 341 to realize the function of calculating the depressed position of the rotary operation device 13 and the depression force at the time when the rotary operation device 13 is depressed, on the basis of detection results by the depression detecting section 20, which detection results are input from the control section 21 through the input/output section 22.

To put it concretely, the main CPU 341 calculates the depressed position and the depression force by performing vector operations on the basis of the respective detection results from the pressure sensors 201 fixated on the top side, the bottom side, the left side, and the right side on the back surface of the PCB substrate 182.

Incidentally, a detection section is composed of the depression detecting section 20 and the main CPU 341 executing the depression detecting program 343b2.

The display control program 343b3 enables the main CPU 341 to realize the function of making the display panel 331 of the display section 33 display an image based on image information stored in the image information storing file 343a1.

Figure 6:
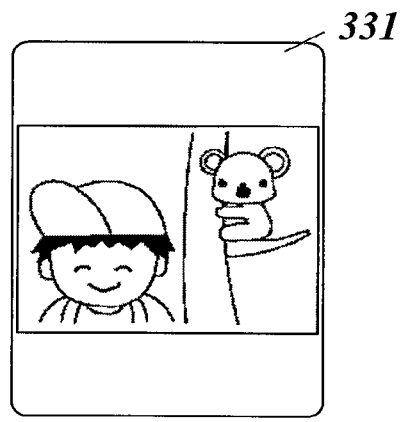
FIG. 6 is a view showing an example of an image displayed in a display section with which the cellular phone handset of the present embodiment.

To put it concretely, the main CPU 341 obtains, for example, the image information pertaining to an image specified by a rotation operation of the rotary operation device 13 by an operator or the like from the image information storing file 343a1 to make the display panel 331 display the image based on the image information, for example, as shown in FIG. 6.

Here, the display state of the image at the time point immediately after the display of the image on the display panel 331 is set as the initial state.

The main CPU 341 functions as a display control section by executing this display control program 343b3.

The magnification ratio change instructing program 343b4 enables the main CPU 341 to realize the function of instructing a change of the display magnification ratio of the image under display on the display panel 331 of the display section 33 to the main CPU 341 executing the display control program 343b3.

Figure 7:
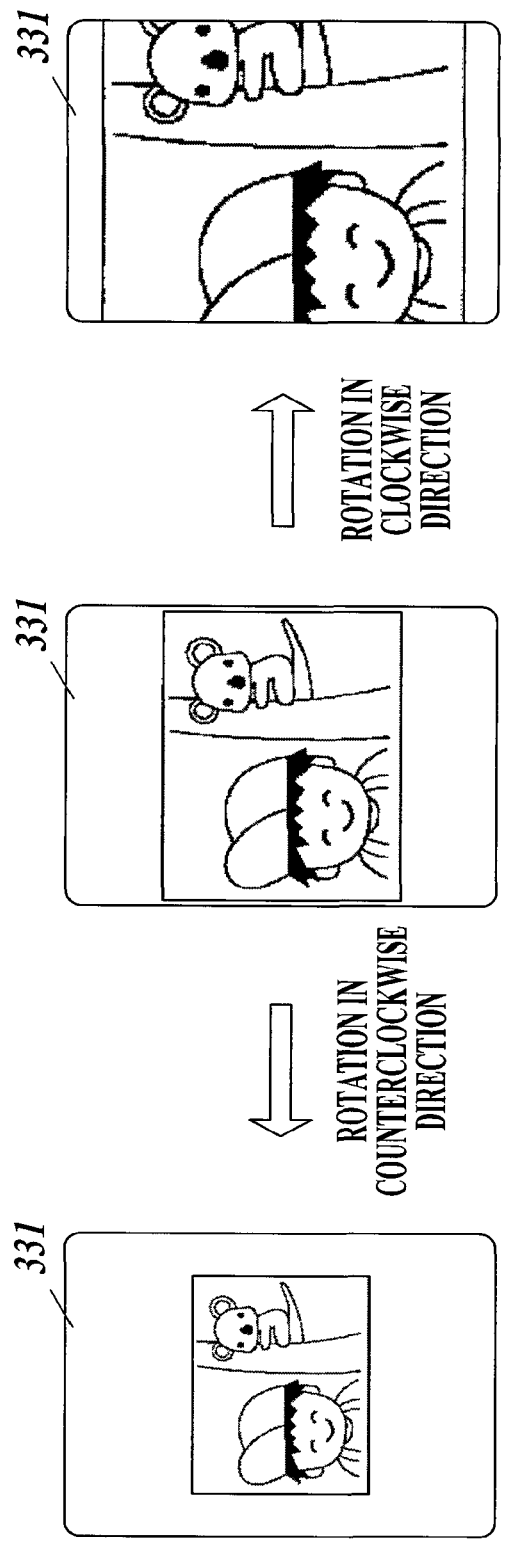
FIG. 7 is a view for describing an example of changes of a display magnification ratio of an image under display.

To put it concretely, when the rotation angle of the rotary operation device 13 calculated (detected) by the main CPU 341 executing the rotation detecting program 343b1 has increased, the main CPU 341 judges that the rotary operation device 13 has rotated in the forward direction (clockwise direction), and issues an instruction to enlarge the image under display. When the rotation angle of the rotary operation device 13 detected by the main CPU 341 executing the rotation detecting program 343b1 has decreased, the main CPU 341 judges that the rotary operation device 13 has rotated backward (in the counterclockwise direction), and issues an instruction to reduce the image under display. Hereby, for example, as shown in FIG. 7, the display magnification ratio of the image under display is changed.

Incidentally, if the display magnification ratio of an image when the display state of the image is the initial state is set as "100%," then it is supposed that a lower limit (for example "10%") and an upper limit (for example "500%") are previously set to the display magnification ratio, and that the intervals of the display magnification ratios (for example, "10%," "25%," "50%," "75%," "100%," "120%," "150%," "200%," and "500%") are also set beforehand. Then, it is set that, when the rotation angle of the rotary operation device 13 reaches, for example, a predetermined magnification ratio changing angle (for example, a multiple of 45 degrees), the main CPU 341 instructs a change of the display magnification ratio of the image under display.

That is, when the detected rotation angle of the rotary operation device 13 is "0 degree," the display magnification ratio of the image under display is "100%." When the detected rotation angle of the rotary operation device 13 becomes "+45 degrees," the display magnification ratio of the image under display is switched to "120%." When the detected rotation angle of the rotary operation device 13 becomes "+90 degrees," the display magnification ratio of the image under display is switched to "150%." Moreover, when the detected rotation angle of the rotary operation device 13 becomes "−45 degrees," the display magnification ratio of the image under display is switched to "75%." When the detected rotation angle of the rotary operation device 13 becomes "−90 degrees," the display magnification ratio of the image under display is switched to "50%."

The main CPU 341 functions as a magnification ratio change instructing section by executing this magnification ratio change instructing program 343b4.

The scroll instructing program 343b5 enables the main CPU 341 to realize the function of instructing the main CPU 341 executing the display control program 343b3 to scroll the image under display on the display panel 331 of the display section 33.

To put it concretely, the main CPU 341 is configured to instruct the scrolling direction of the image under display on the basis of the depressed position of the rotary operation device 13 calculated (detected) by the main CPU 341 executing the depression detecting program 343b2.

Figure 8:
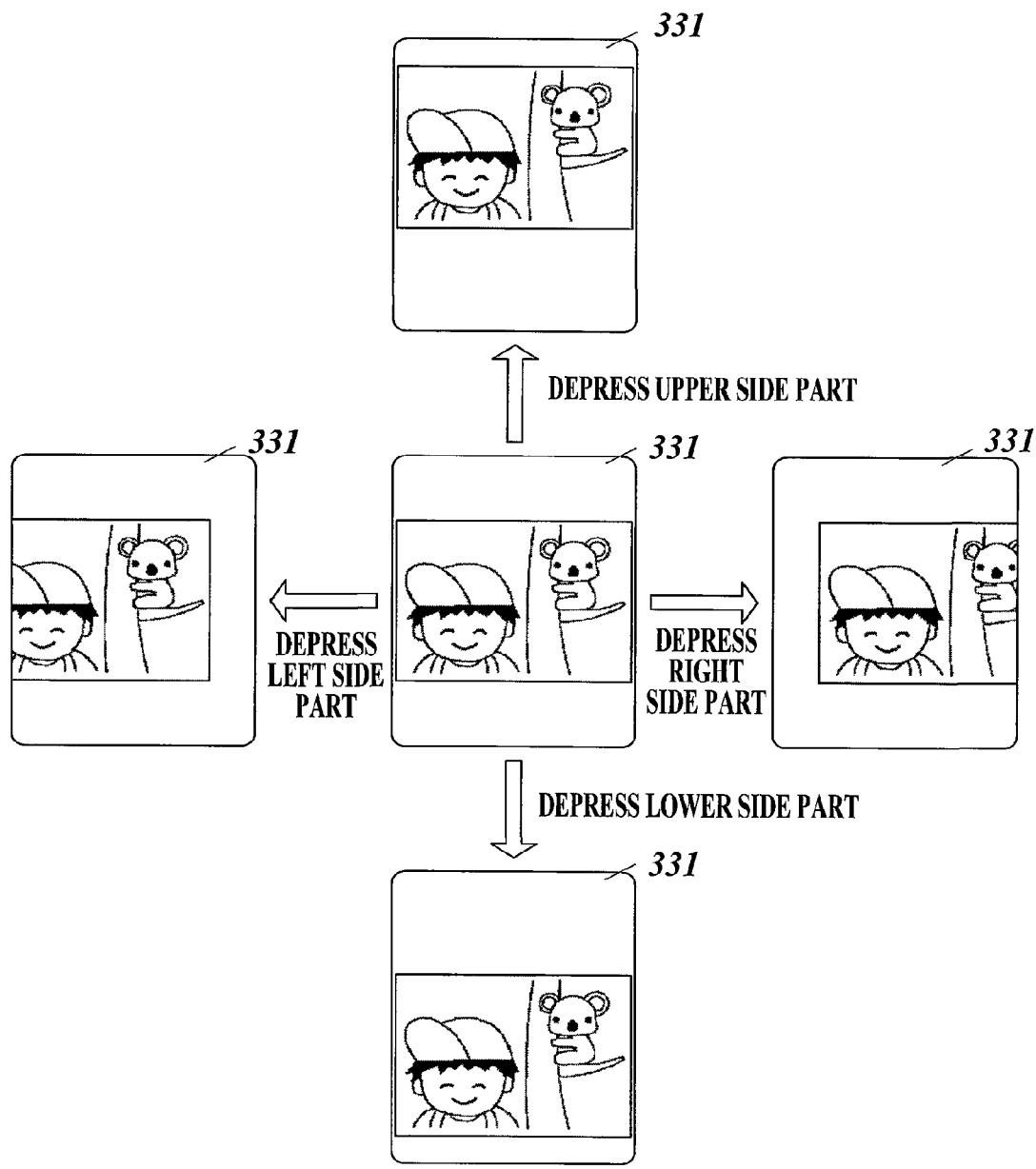
FIG. 8 is a view for describing an example of the scrolling the image under display.

That is, when the depression of the upper side part of the rotary operation device 13 is detected, the main CPU 341 issues the instruction of scrolling the image under display upward. When the depression of the lower side part of the rotary operation device 13 is detected, the main CPU 341 issues the instruction of scrolling the image under display downward. When the depression of the left side part of the rotary operation device 13 is detected, the main CPU 341 issues the instruction of scrolling the image under display leftward. When the depression of the right side part of the rotary operation device 13 is detected, the main CPU 341 issues the instruction of scrolling the image under display rightward. Hereby, for example, as shown in FIG. 8, the image under display is scrolled.

Incidentally, it is supposed that the scrolling movement quantity of the image caused by one time depression (short period depression) operation is previously set.

Here, when the upper side part, the lower side part, the left side part, or the right side part of the rotary operation device 13 is depressed for a long time, the main CPU 341 is configured to issue the instruction of the scrolling of the image under display at a scrolling speed according to the magnitude of the depression force calculated (detected) by the main CPU 341 executing the depression detecting program 343b2.

To put it concretely, for example, if the depression of the upper side part of the rotary operation device 13 is detected and the detected depression force is less than a first threshold value, the main CPU 341 is configured to issue the instruction of scrolling the image under display upward at a first scrolling speed during the long period depression of the upper side part to switch the display position of the image. If the detected depression force is equal to or more than the first threshold value and less than a second threshold value (first threshold value<second threshold value), the main CPU 341 is configured to issue the instruction of scrolling the image under display upward at a second scrolling speed faster than the first scrolling speed during the long period depression of the upper side part to switch the display position of the image. If the detected depression force is equal to or more than the second threshold value, the main CPU 341 is configured to issue the instruction of scrolling the image under display at a third scrolling speed faster than the second scrolling speed during a long period depression of the upper side part.

The operations of the scrolling in the cases of the long period depressions of the lower side part, the left side part, and the right side part of the rotary operation device 13 are similar to that described above.

Moreover, if the image under display gets out of the display area (display screen) by scrolling, the main CPU 341 is configured to issue the instruction of scrolling the image under display in the direction reverse to that of the scrolling.

Figure 9:
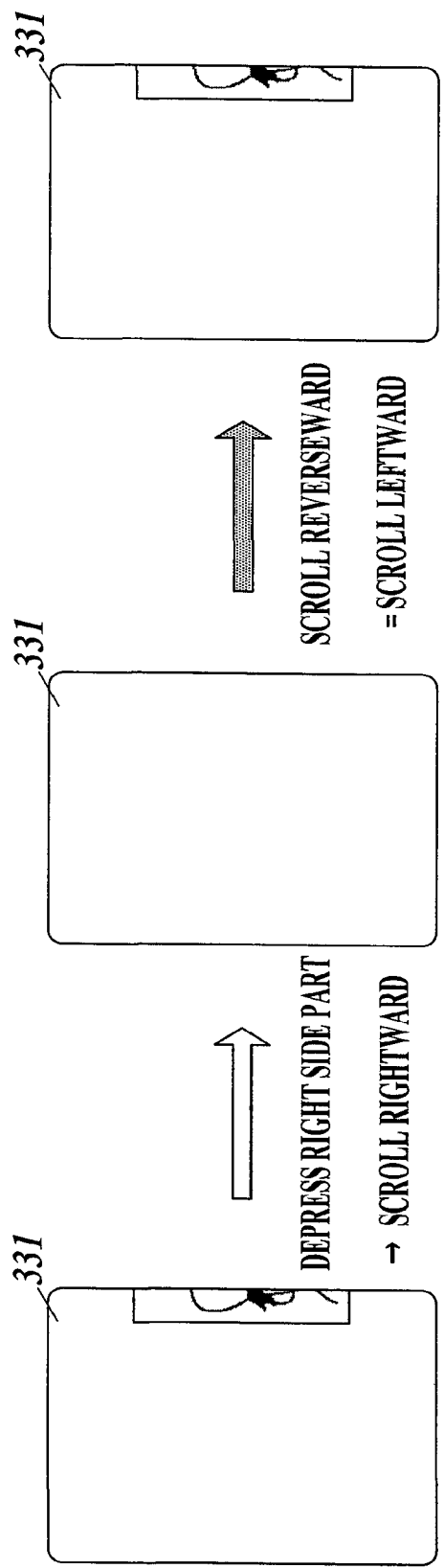
FIG. 9 is a view for describing an example of the case where the image under display gets out of a display area by scrolling.

To put it concretely, for example, as shown in FIG. 9, if the image under display gets out of the display area to disappear from the display screen of the display panel 331 by scrolling the image under display rightward in accordance with a depression of the right side part of the rotary operation device 13 by an operator, the main CPU 341 is configured to issue the instruction of leftward scrolling to return the display position of the image under display to the position just before the getting out of the display area of the image.

Moreover, for example, if the image under display gets out of the display area to disappear from the display screen of the display panel 331 by scrolling the image under display leftward in accordance with a depression of the left side part of the rotary operation device 13 by an operator, the main CPU 341 is configured to issue the instruction of rightward scrolling to return the display position of the image under display to the position just before the getting out of the display area of the image.

Moreover, for example, if the image under display gets out of the display area to disappear from the display screen of the display panel 331 by scrolling the image under display upward in accordance with a depression of the upper side part of the rotary operation device 13 by an operator, the main CPU 341 is configured to issue the instruction of downward scrolling to return the display position of the image under display to the position just before the getting out of the display area of the image.

Moreover, for example, if the image under display gets out of the display area to disappear from the display screen of the display panel 331 by scrolling the image under display downward in accordance with a depression of the lower side part of the rotary operation device 13 by an operator, the main CPU 341 is configured to issue the instruction of upward scrolling to return the display position of the image under display to the position just before the getting out of the display area of the image.

The main CPU 341 functions as a scroll instructing section by executing this scroll instructing program 343b5.

The force sense presenting program 343b6 enables the main CPU 341 to realize the function of presenting a force sense to an operator through the rotary operation device 13 by inputting a control signal in the control section 21 through the input/output section 22 to make the control section 21 output a drive signal to the piezoelectric element 163 of the ultrasonic motor 16.

Here, the "force sense" does not mean the sense of touch caused by a mere vibration, but means the sense of a weight applied to a finger at the time of rotating the rotary operation device 13 in the present invention. To put it concretely, the "force sense" means the sense of feeling a rotation light or heavy.

The main CPU 341 presents a force sense by a combination of at least any two of applying a rotary force in the clockwise direction to the rotary operation device 13, applying a rotary force in the counterclockwise direction, and stopping applying the rotation forces when the display state pertaining to the display position or the display magnification ratio of the image under display is switched.

That is, when the image under display is scrolled, the main CPU 341 presents a force sense to give an operator a clicking feeling (operating feeling), and thereby the main CPU 341 makes the operator perceive the scrolling of the image under display.

Moreover, when the display magnification ratio of the image under display is changed, the main CPU 341 presents a force sense to give an operator a clicking feeling (operating feeling), and thereby the main CPU 341 makes the operator perceive the change of the display magnification ratio of the image under display.

Here, the main CPU 341 is configured to change the way of presenting the force sense, for example, in order that the operator can perceive the display state of the image under display distinguishably.

To put it concretely, for example, if the CPU 341 executing the scroll instructing program 343b5 issues the instruction of scrolling the image under display, the main CPU 341 performs a series of force sense presenting processing of applying a rotary force in the counterclockwise direction to the rotary operation device 13 to rotate the rotary operation device 13 in the counterclockwise direction by a predetermined angle in a predetermined time before stopping the applying of the rotary force, and, after that, applying a rotary force in the clockwise direction to the rotary operation device 13 to rotate the rotary operation device 13 in the clockwise direction by a predetermined angle in a predetermined time before stopping applying the rotary force, more than once repeatedly, and thereby the main CPU 341 presents a force sense.

At this time, the main CPU 341 is configured to change the way of presenting of the force sense so that an operator can perceive the display position of the image under display distinguishably by, for example, by changing any one of the rotary force to be applied, a rotation time, a rotation angle, and the number of times of repeating the force sense presenting processing, as the display position of the image under display in a display area changes by scrolling.

To put it concretely, for example, the main CPU 341 changes the way of presenting a force sense so that an operator can perceive the display position distinguishably by shortening the rotation time and increasing the number of times of repeating the force sense presenting processing as the center of the image under display becomes more distant from the center of the display area (display screen) owing to scrolling the image under display, and by lengthening the rotation time and lessening the number of times of repeating the force sense presenting processing as the center of the image under display approaches the center of the display area (display screen).

Then, when the image under display gets out of the display area by scrolling, the main CPU 341 makes an operator perceive that the image under display is not scrolled even if the same positions of the rotary operation device 13 are depressed furthermore, by presenting a force sense to give the operator a breaking feeling by once performing a series of the force sense presenting processing of applying a rotary force in the counterclockwise direction to the rotary operation device 13 to rotate the rotary operation device 13 in the counterclockwise direction by the predetermined angle in the predetermined time before stopping applying the rotary force.

Incidentally, the way of presenting the force sense may be made to be the same in the case where the image under display gets out of the display area by upward scrolling, the case where the image under display gets out of the display area by downward scrolling, the case where the image under display gets out of the display area by leftward scrolling, and the case where the image under display gets out of the display area by rightward scrolling. Alternatively, the way of presenting the force sense may be changed so that the operator can perceives the respective cases distinguishable, by changing at least one of the rotation direction, the rotary force to be applied, the rotation time, and the rotating angle.

Moreover, for example, if the main CPU 341 executing the magnification ratio change instructing program 343b4 issues the instruction of changing the display magnification ratio of the image under display, the main CPU 341 presents a force sense by repeatedly performing a series of force sense presenting processing more than once. The series of force sense present processing includes applying a rotary force in the counterclockwise direction to the rotary operation device 13 to rotate the rotary operation device 13 in the counterclockwise direction by the predetermined angel in the predetermined time and stopping applying the rotary force, and, after that, applying a rotary force in the clockwise direction to the rotary operation device 13 to rotate the rotary operation device 13 in the clockwise direction by the predetermined angle in the predetermined time and stopping applying the rotary force.

At this time, the main CPU 341 is configured to change the way of presenting the force sense so that the operator may perceive the display magnification ratio distinguishably by, for example, changing at least any one of the rotary force to be applied, a rotation time, a rotation angle, and the number of times of repeating the force sense presenting processing as the display magnification ratio of the image under display is changed.

To put it concretely, the main CPU 341 changes the way of the presenting the force sense in order enable the operator to perceive the display magnification of the image under display distinguishably by, for example, shortening the rotation time and increasing the number of times of repeating the force sense presenting processing as the display magnification ratio of the image under display becomes more distant from "100%," and by lengthening the rotation time and lessening the number of times of repeating the force sense presenting processing as the display magnification ratio of the image under display approaches "100%," by changing the display magnification ratio of the image under display.

Then, the main CPU 341 presents the force sense by the combination of applying the rotary force in the reverse rotation direction to the rotary operation device 13 and stopping applying the rotary force in the case where the rotary operation device 13 rotates in the forward direction (clockwise direction) in the state in which the display magnification ratio of the image under display reaches the upper limit thereof (first case), and/or the case where the rotary operation device 13 rotates backward (counterclockwise direction) in the state in which the display magnification ratio of the image under display reaches the lower limit thereof (second case), by a change of the display magnification ratio.

For example, in the first case, the main CPU 341 once performs a series of force sense presenting processing of applying a rotary force in the counterclockwise direction to the rotary operation device 13 to rotate the rotary operation device 13 counterclockwise by a predetermined angle in a predetermined time before stopping applying the rotary force, and thereby the main CPU 341 presents a force sense to give an operator a breaking feeling. The main CPU 341 thus makes the operator perceive that the image under display does not enlarge even if the rotary operation device 13 is further rotated in the same direction (clockwise direction).

Moreover, for example, in the second case, the main CPU 341 once performs a series of force sense presenting processing of applying a rotary force in the clockwise direction to the rotary operation device 13 to rotate the rotary operation device 13 in the clockwise direction by a predetermined angle in a predetermined time before stopping applying the rotary force, and thereby the main CPU 341 presents a force sense to give an operator a breaking feeling. The main CPU 341 thus makes the operator perceive that the image under display does not become smaller even if the rotary operation device 13 is further rotated in the same direction (counterclockwise direction).

Incidentally, the rotary forces to be applied, the rotation times, and the rotation angles may be the same or different in both of the first and second cases.

Here, the reverse rotation direction means the counterclockwise direction when the rotary operation device 13 is operated to rotate in the clockwise direction by an operator, and means the clockwise direction when the rotary operation device 13 is operated to rotate in the counterclockwise direction by an operator.

Moreover, the rotary force to be applied to the rotary operation device 13, the time for which the rotary operation device 13 is rotated (the aforesaid "predetermined time"), and the angle by which the rotary operation device 13 is rotated (the aforesaid "predetermined angle") are arbitrary as long as they can present a force sense to an operator. To put it concretely, for example, rotary force $\geq 0.05$ Ncm is preferable as the rotary force to be applied to the rotary operation device 13; 3 msec$\leq$time$\leq$6 msec is preferable as the time for which the rotary operation device 13 is rotated; and 1 degree$\leq$angle$\leq$5 degrees is preferable as the angle by which the rotary operation device 13 is rotated.

The main CPU 341 functions as a force sense presenting section by executing this force sense presenting program 343b6.

Here, in the present embodiment, the rotary input device 10 includes the main control section 34 besides the rotation detecting section 14, the ultrasonic motor 16, the depression detecting section 20, the control section 21, the input/output section 22, and the like.

(Force Sense Presenting Processing)

Figure 10:
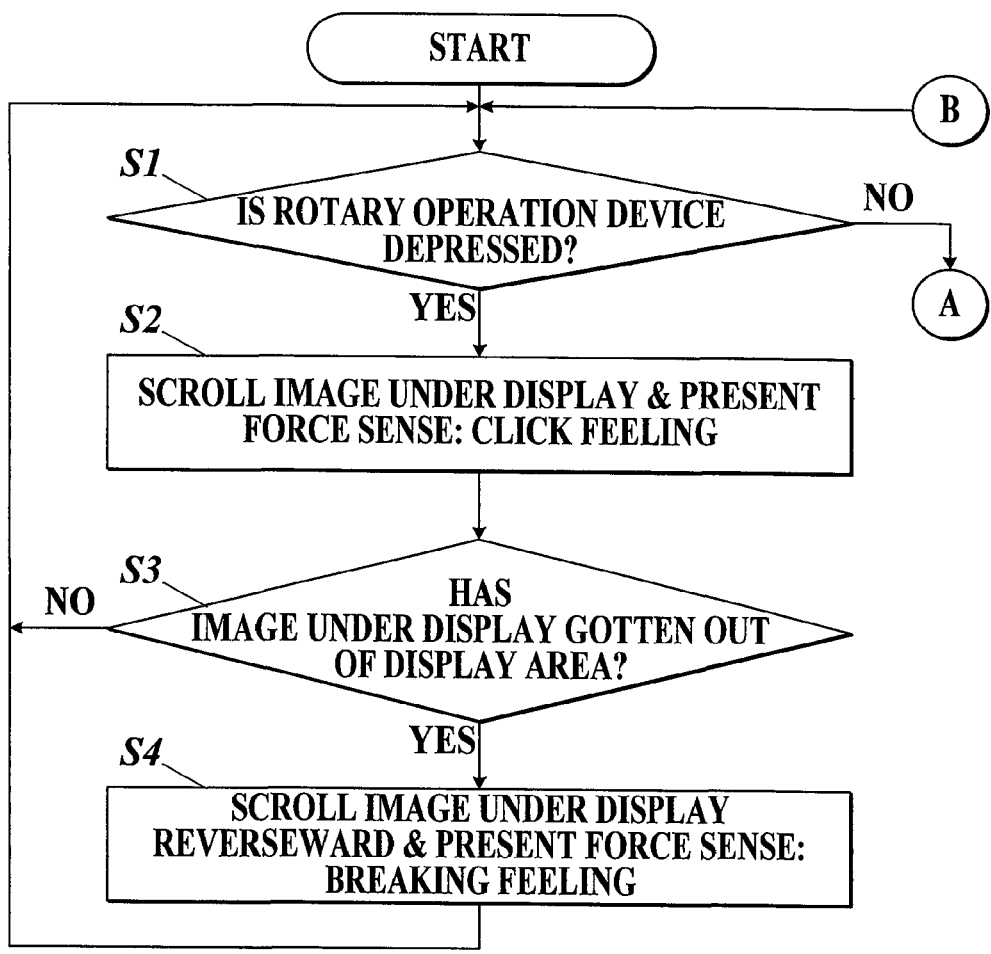
FIG. 10 is a flow chart for describing the processing pertaining to the presentation of a force sense to an operator of the cellular phone handset of the present embodiment.
Figure 11:
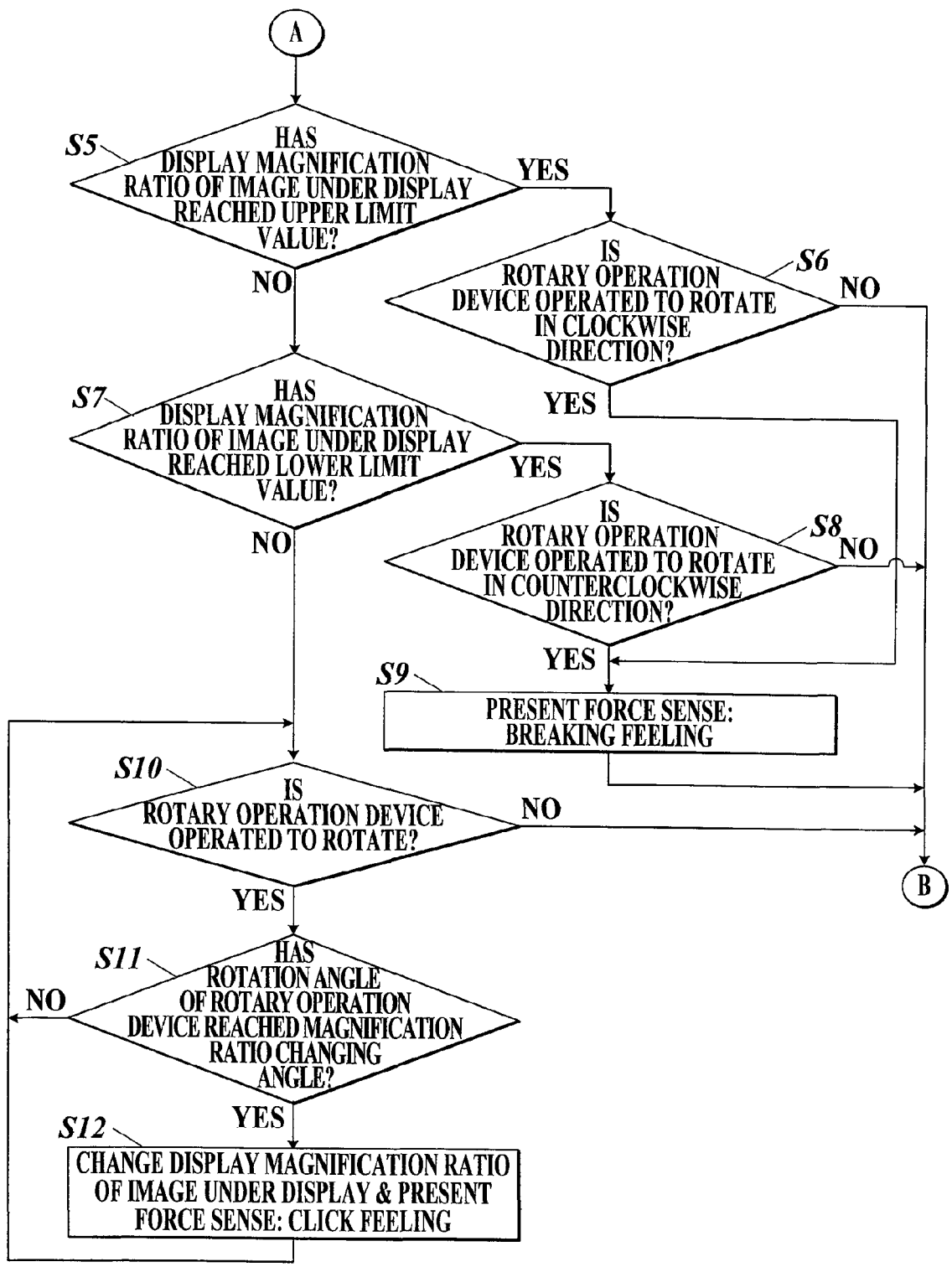
FIG. 11 is a flow chart for describing the processing pertaining to the presentation of the force sense to the operation of the cellular phone handset of the present embodiment.

Next, the processing pertaining to the presentation of the force sense to an operator by the cellular phone handset 1 of the present embodiment will be described with reference to the flow charts of FIGS. 10 and 11.

First, the main CPU 341 judges whether a depression of the upper side part, the lower side part, the left side part, or the right side part is detected by the rotary operation device 13 or not (Step S1).

If the main CPU 341 judges that the depression of the upper side part, the lower side part, the left side part, or the right side part of the rotary operation device 13 is detected at Step S1 (Step S1; Yes), then the main CPU 341 executes the scroll instructing program 343b5 to scroll the image under display in the scrolling direction according to the depressed position of the rotary operation device 13, and executes the force sense presenting program 343b6 to present the force sense by the presenting method according to the display position of the image under display to the display area by means of the combination of applying the rotary force in the clockwise direction to the rotary operation device 13, applying the rotary force in the counterclockwise direction, and stopping applying the rotary force, and the main CPU 341 thus gives a clicking feeling to the operator (Step S2).

Here, it is supposed that, if the upper side part, the lower side part, the left side part, or the right side part of the rotary operation device 13 is depressed for a long time, the main CPU 341 scrolls the image under display at a scrolling speed according to the magnitude of the depression force, and that the main CPU 341 presents a force sense every switching of the display position of the image under display by the scrolling.

Next, the main CPU 341 judges whether the image under display has gotten out of the display area or not (Step S3).

If the main CPU 341 judges that the image under display has not gotten out of the display area at Step S3 (Step S3; No), the main CPU 341 repeatedly performs the processing on and after Step S1.

On the other hand, if the main CPU 341 judges that the image under display has gotten out of the display area at Step S3 (Step S3; Yes), then the main CPU 341 executes the scroll instructing program 343b5 to scroll the image in the direction reverse to the scrolling direction at Step S2, and executes the force sense presenting program 343b6 to present a force sense by the combination of applying the rotary force in the counterclockwise direction to the rotary operation device 13 and stopping applying the rotary force. The main CPU 341 thus gives the operator a breaking feeling (Step S4), and repeatedly performs the processing on and after Step S1.

Moreover, if the main CPU 341 judges that the depression of the upper side part, the lower side part, the left side part, or the right side part of the rotary operation device 13 is not detected at Step S1 (Step S1; No), then the main CPU 341 judges whether the display magnification ratio of the image under display has reached the upper limit value thereof or not (Step S5).

If the main CPU 341 judges that the display magnification ratio of the image under display has reached the upper limit value at Step S5 (Step S5; Yes), then the main CPU 341 judges whether the rotary operation device 13 is operated to rotate in the clockwise direction or not on the basis of the detected rotation angle of the rotary operation device 13 (Step S6).

If the main CPU 341 judges that the rotary operation device 13 is not operated to rotate in the clockwise direction at Step S6 (Step S6; No), then the main CPU 341 repeatedly performs the processing on and after Step S1.

On the other hand, if the main CPU 341 judges that the rotary operation device 13 is operated to rotate in the clockwise direction at Step S6 (Step S6; Yes), then the main CPU 341 shifts the processing to that at Step S9.

Moreover, if the main CPU 341 judges that the display magnification ratio of the image under display has not reached the upper limit value at Step S5 (Step S5; No), then the main CPU 341 judges whether the magnification ratio of the image under display has reached the lower limit value thereof or not (Step S7).

If the main CPU 341 judges that the display magnification ratio of the image under display has reached the lower limit value at Step S7 (Step S7; Yes), the main CPU 341 judges whether the rotary operation device 13 is operated to rotate in the counterclockwise direction or not on the basis of the detected rotation angle of the rotary operation device 13 (Step S8).

If the main CPU 341 judges that the rotary operation device 13 is not operated to rotate in the counterclockwise direction at Step S8 (Step S8; No), then the main CPU 341 repeatedly performs the processing on and after Step S1.

On the other hand, if the main CPU 341 judges that the rotary operation device 13 is operated to rotate in the counterclockwise direction at Step S8 (Step S8; Yes), then the main CPU 341 executes the force sense presenting program 343b6 presents a force sense by the combination of applying the rotary force in the reverse rotation direction to the rotary operation device 13 and stopping applying the rotary force, and thereby gives the operator a breaking feeling (Step S9). Then, the main CPU 341 repeatedly performs the processing on and after Step S1.

Moreover, if the main CPU 341 judges that the display magnification ratio of the image under display has not reached the lower limit value thereof at Step S7 (Step S7; No), then the main CPU 341 judges whether the rotary operation device 13 is operated to rotate in the clockwise direction or the counterclockwise direction or not on the basis of the detected rotation angle of the rotary operation device 13 (Step S10).

If the main CPU 341 judges that the rotary operation device 13 is not operated to rotate in any of the clockwise direction and the counterclockwise direction at Step S10 (Step S10; No), then the main CPU 341 repeatedly performs the processing on and after Step S1.

On the other hand, if the main CPU 341 judges that the rotary operation device is operated to rotate in the clockwise direction or the counterclockwise direction at Step S10 (Step S10; Yes), then the main CPU 341 judges that the detected rotation angle of the rotary operation device 13 has reached the magnification ratio changing angle or not on the basis of the rotation angle of the rotary operation device 13 (Step S11).

If the main CPU 341 judges that the rotation angle of the rotary operation device 13 has not reached the magnification ratio changing angle at Step S11 (Step S11; No), then the main CPU 341 repeatedly performs the processing on and after Step S10.

On the other hand, if the main CPU 341 judges that the rotation angle of the rotary operation device 13 reached the magnification ratio changing angle at Step S11 (Step S11; Yes), then the main CPU 341 executes the magnification ratio change instructing program 343b4 to change the image magnification ratio of the image under display by enlarging the image under display when the rotary operation device 13 has been operated to rotate in the clockwise direction and the magnification ratio of the image under display reaches the magnification ratio changing angle, or by reducing the image under display when the rotary operation device 13 has been operated to rotate in the counterclockwise direction and the magnification ratio of the image under display has reached the magnification ratio changing angle, and the main CPU 341 executes the force sense presenting program 343b6 to present a force sense by the presenting method according to the display magnification ratio of the image under display by the combination of applying the rotary force in the clockwise direction to the rotary operation device 13, applying the rotary force in the counterclockwise direction, and stopping applying the rotary force. The main CPU 341 thus gives the operator a clicking feeling (Step S12), and repeatedly performs the processing on and after Step S10.

According to the cellular phone handset 1 of the present embodiment described above, a rotary input device includes: a rotary operation device 13 rotatable around a shaft by receiving a rotation operation of an operator; a ultrasonic motor 16 to apply a rotary force to the rotary operation device 13; a depression detecting section 20 to detect a depression of the rotary operation device 13 in an axial direction and a main CPU 341 executing a depression detecting program 343b2; the main CPU 341 executing a force sense presenting program 343b6 to present the operator a force sense through the rotary operation device 13 by a combination of at least any two of applying the rotary force in a clockwise direction to the rotary operation device 13 by the ultrasonic motor 16, applying the rotary force in a counterclockwise direction, and stopping applying the rotary force; the main CPU 341 executing a display control program 343b3 to make a display section 33 display a predetermined image; the main CPU 341 executing a magnification ratio change instructing program 343b4 to instruct the main CPU 341 executing the display control program 343b3 to change a display magnification ratio of an image under display in the display section 33; and the main CPU 341 executing a scroll instructing program 343b5 to instruct the main CPU 341 executing the display control program 343b3 to scroll the image under display in the display section 33. Then, the CPU 341 executing the magnification ratio change instructing program 343b4 instructs enlargement of the image under display when the rotary operation device 13 rotates in the clockwise direction, and instructs reduction of the image under display when the rotary operation device 13 rotates in the counterclockwise direction; the depression detection section 20 and the main CPU 341 executing the depression detecting program 343b2 can detect a depressed position of the rotary operation device 13; the main CPU 341 executing the scroll instructing program 343b5 instructs a scrolling direction of the image under display on the basis of the detected depressed position of the rotary operation device 13; and the main CPU 341 executing the force sense presenting program 343b6 and the ultrasonic motor 16 change a way of presenting the force sense in order that the operator can perceive a display state pertaining to a display position or a display magnification ratio of the image under display distinguishably.

That is, because the clicking feeling according to the display state pertaining to the display position of the display magnification ratio of the image under display can be given to the operator, it is possible to enable the operator to recognize the display state of the image under display intuitively.

Moreover, according to the cellular phone handset 1 of the present embodiment described above, the main CPU 341 executing the force sense presenting program 343b6 and the ultrasonic motor 16 change the way of presenting the force sense in order that the operator can perceive the display position distinguishably as the display position of the image under display to a display area changes by scrolling.

That is, because it is possible to give the operator the clicking feeling according to the display position of the image under display, it is possible to enable the operator to recognize the display position of the image under display intuitively.

Moreover, according to the cellular phone handset 1 of the present embodiment described above, when the image under display gets out of the display area by the scrolling, the main CPU 341 executing the scroll instructing program 343b5 instructs scrolling of the image under display in a direction reverse to that of the scrolling; and when the image under display gets out of the display area by the scrolling, the main CPU 341 executing the force sense presenting program 343*b*6 presents the force sense.

That is, because it is possible to give the operator a breaking feeling when the image under display gets out of the display area by scrolling, it is possible to enable the operator to intuitively recognize that the image under display is not scrolled even if the rotary operation device 13 is further depressed in the same direction.

Moreover, because, even if the image under display gets out of the display area to disappear from the display screen by scrolling, it is possible to return the image on the display screen again by performing the scrolling in the direction reverse to that of the preceding scrolling, the cellular phone handset 1 is suitable.

Moreover, according to the cellular phone handset 1 in the present embodiment described above, the main CPU 341 executing the force sense presenting program 343*b*6 and the ultrasonic motor 16 change the way of presenting the force sense in order that the operator can perceive the display magnification ratio distinguishably as the display magnification ratio of the image under display changes.

That is, because it is possible to give an operator a click feeling according to the display magnification ratio of the image under display, it is possible to enable the operator to intuitively recognize the display magnification ratio of the image under display.

Moreover, according to the cellular phone handset 1 of the present embodiment described above, the main CPU 341 executing the force sense presenting program 343*b*6 presents the force sense by a combination of applying the rotary force in a reverse rotation direction to the rotary operation device 13 and stopping applying the rotary force when the rotary operation device 13 rotates in the clockwise direction in a state in which the display magnification ratio of the image under display has reached an upper limit and/or when the rotary operation device 13 rotates in the counterclockwise direction in a state in which the display magnification ratio of the image under display has reached a lower limit, by a change of the display magnification ratio.

That is, because it is possible to give an operator a breaking feeling when the operator operates further when the operator intends to further increase the display magnification ratio and operates the rotary operation device 13 to rotate it in the state in which the display magnification ratio of the image under display has reached the upper limit or when the operator intends to further decrease the display magnification ratio and operates the rotary operation device 13 to rotate it in the state in which the display magnification ratio of the image under display has reached the lower limit, it is possible to enable the operator to intuitively recognize that the display magnification ratio of the image under display cannot be change any longer.

Moreover, according to the cellular phone handset 1 of the present embodiment described above, the depression detecting section 20 and the main CPU 341 executing the depression detecting program 343*b*2 can detect a depression force at the time of the depression of the rotary operation device, and the CPU 341 executing the scroll instructing program 343*b*5 instructs the scrolling of the image under display at a scrolling speed according to a magnitude of the detected detection force.

Consequently, because the scrolling speed can be changed according to the depression force to the rotary operation device 13, the image under display can be displayed at a desired display position more rapidly, and the cellular phone handset 1 is suitable.

Incidentally, the present invention is not limited to the embodiment described above, and can be changed suitably without departing from the subject matter thereof.

Moreover, although the cellular phone handset 1 is illustrated as the electronic equipment equipped with the rotary input device according to the present invention, the electronic equipment of the present invention is not limited to the cellular phone handset 1, but the present invention can be applied to any kinds of electronic equipment as long as the electronic equipment can perform input operations with the rotary input device 10. The rotary input device 10 of the present invention may be applied to, for example, the other portable terminal devices, such as a portable audio player and a personal digital assistance (PDA), audio visual (AV) equipment, such as a television receiver, and a personal computer1. Moreover, the rotary input device 10 may previously be incorporated in electronic equipment, or may be used by being connected to electronic equipment as an external device as a single body.

Moreover, although the optical rotation detecting section 14 composed of a toric code wheel and a photointerrupter as the detection section detecting the rotation angle of the rotary operation device 13 has been illustrated in the embodiment described above, the rotation detecting section 14 is an example of the detection section, and any configuration may be used as long as the configuration can detect the rotation positions of the rotary operation device 13. For example, a mechanical type (contact type) rotation detecting section, a magnetic type one, an electrostatic type one performing position detection by means of an electrostatic capacity change of an electrode, and the like can be used.

Furthermore, an absolute type rotary encoder capable of detecting an absolute position in addition to the rotation quantity and the rotation direction of the rotary operation device 13 may be used.

Moreover, although the ultrasonic motor 16 has been illustrated as the rotation driving section to perform the rotation driving of the rotary operation device 13 in the embodiment described above, the ultrasonic motor 16 is an example of the rotation driving section, any configuration can be used as long as the configuration can perform the rotation driving of the rotary operation device 13. For example, a static actuator performing driving by using the mutual absorption and repulsion of electrostatic charges as motive power, an electromagnetic actuator performing driving by using a force caused by mutual interaction between a magnetic field and electric power, a magnetostrictive actuator, a hydraulic cylinder, a pneumatic cylinder, and the like can be used. Moreover, the drive control of the rotation driving section may be the control of transmitting the motive power of an actuator to a driven body, such as the rotary operation device 13, as it is, or may be the one using a stepping motor operating in proportion to a drive pulse number. Moreover, an actuator performing driving by rotating a driven body may be used, or a linear actuator performing the driving by linearly moving a driven body may be used.

Moreover, although the forward direction is illustrated as the clockwise direction and the backward direction is illustrated as the counterclockwise direction in the embodiment described above, the counterclockwise direction may be set as the forward direction and the clockwise direction may be set as the backward direction.

Moreover, although the magnification ratio changing angle is set as a multiple of 45 degrees in the embodiment described above, the magnification ratio changing angle is not limited to this angle. The magnification ratio changing angle is arbitrary, and, for example, may be changed according to the kind of an image, a display state, and the like.

Moreover, although the depression detecting section 20 is equipped with four pressure sensors 201 fixated at four positions on the top side, the bottom side, the left side, and the right side on the back surface of the PCB substrate 182 in the embodiment described above, the pressure sensors are not limited to those ones. The number and the fixation positions of the pressure sensors 201 with which the depression detecting section 20 is equipped are arbitrary as long as the pressure sensors 201 can detect at least the depressions of the upper side part, the lower side part, the left side part, and the right side part of the rotary operation device 13.

Moreover, although the image based on the image information stored in the image information storing file 343a1 is illustrated as the image to be displayed in the display section 33 in the embodiment described above, the image is not limited to this one, but the image to be displayed in the display section 33 is arbitrary.

Moreover, the embodiment described above is configured to present a force sense when the main CPU 341 executing the scroll instructing program 343b5 instructs the scrolling of the image under display, and to make an operator perceive the switching of the display position of an image and the display position of the switching destination. Moreover, when the main CPU 341 executing the magnification ratio change instructing program 343b4 instructs the change of the display magnification ration of the image under display, the embodiment is configured to present a force sense to make the operator perceive the switching of the display magnification ratio of the image and the display magnification ratio of the switching destination. However, the contents to be perceived by the operator are not limited to those ones, but the contents to be perceived by the operator by the presentation of a force sense are arbitrary as long as they enable the operator to perceive the display state pertaining to the display position or the display magnification ratio of the image under display distinguishably. For example, when the main CPU 341 executing the scroll instructing program 343b5 instructs the scrolling of the image under display, a force sense may be presented to make the operator perceive the switching of the display position of the image and the display magnification ratio of the image. Alternatively, when the main CPU 341 executing the magnification ratio change instructing program 343b4 instructs the change of the display magnification ratio of the image under display, a force sense may be presented to make the operator perceive the switching of the display magnification ratio of the image and the display position of the image.

Moreover, the way of presenting the force sense is not limited to that of the embodiment described above, but the way is arbitrary as long as the way can present a force sense by the combination of at least any two of applying a rotary force in the clockwise direction to the rotary operation device 13, applying a rotary force in the counterclockwise direction, and stopping applying the rotary force.

According to the embodiment, there is provided a rotary input device, including: a rotary operation device rotatable around a shaft by receiving a rotation operation of an operator; a rotation driving section to apply a rotary force to the rotary operation device; a detection section to detect a depression of the rotary operation device in an axial direction; a force sense presenting section to present the operator a force sense by a combination of at least any two of applying the rotary force in a clockwise direction to the rotary operation device by the rotation driving section, applying the rotary force in a counterclockwise direction, and stopping applying the rotary force; a display control section to make a display section display a predetermined image; a magnification ratio change instructing section to instruct the display section to change a display magnification ratio of an image under display; and a scroll instructing section to instruct the display control section to scroll the image under display, wherein the magnification ratio change instructing section instructs enlargement of the image under display when the rotary operation device rotates in any one side of the clockwise direction and the counterclockwise direction, and instructs reduction of the image under display when the rotary operation device rotates in the other side; the detection section can detect a depressed position of the rotary operation device; the scroll instructing section instructs a scrolling direction of the image under display on the basis of the depressed position of the rotary operation device detected by the detection section; and the force sense presenting section changes a way of presenting the force sense in order that the operator can perceive a display state pertaining to a display position or a display magnification ratio of the image under display distinguishably.

Preferably, the force sense presenting section changes the way of presenting the force sense in order that the operator can perceive the display position distinguishably as the display position of the image under display to a display area changes by scrolling.

Preferably, when the image under display gets out of the display area by the scrolling, the scroll instructing section instructs scrolling of the image under display in a direction reverse to that of the scrolling; and when the image under display gets out of the display area by the scrolling, the force sense presenting section presents the force sense.

Preferably, the force sense presenting section changes the way of presenting the force sense in order that the operator can perceive the display magnification ratio distinguishably as the display magnification ratio of the image under display changes.

Preferably, the force sense presenting section presents the force sense by a combination of applying the rotary force in a reverse rotation direction to the rotary operation device and stopping applying the rotary force when the rotary operation device rotates to the one side in a state in which the display magnification ratio of the image under display has reached an upper limit and/or when the rotary operation device rotates to the other side in a state in which the display magnification ratio of the image under display has reached a lower limit, by a change of the display magnification ratio.

Preferably, the detection section can detect a depression force at the time of the depression of the rotary operation device, and the scroll instructing section instructs the scrolling of the image under display at a scrolling speed according to a magnitude of the detection force detected by the detection section.

There is also provided electronic equipment, including: the rotary input device; and the display section.

According to the present invention, because a clicking feeling according to the display state pertaining to the display position or the display magnification ratio of the image under display can be given to an operator, it is possible to enable the operator to intuitively recognize the display state of the image under display.

The entire disclosure of Japanese Patent Application No. 2009-104034 filed on Apr. 22, 2009 including description, claims, drawings, and abstract are incorporated herein by reference in its entirety.

What is claimed is:
1. A rotary input device, comprising:
a rotary operation device rotatable around a shaft by receiving a rotation operation of an operator;

an ultrasonic motor as a rotation driving section to apply a rotary force to the rotary operation device;

a force sense presenting section to present the operator a force sense by a combination of at least any two of: i) applying the rotary force in a clockwise direction to the rotary operation device by the rotation driving section, ii) applying the rotary force in a counterclockwise direction, and iii) stopping applying the rotary force;

a display control section to make a display section display a predetermined image; and a magnification ratio change instructing section to instruct the display section to change a display magnification ratio of an image under display;

a scroll instructing section to instruct the display control section to scroll the image under display; wherein the magnification ratio change instructing section instructs enlargement of the image under display when the rotary operation device rotates in any one side of the clockwise direction and the counterclockwise direction, and instructs reduction of the image under display when the rotary operation device rotates in the other side, the scroll instructing section instructs the display control section to change a display position of the image under display with respect to a display area in response to the scroll instruction, the force sense presenting section changes a way of presenting the force sense in order that the operator can perceive a display state pertaining to the display position or the display magnification ratio of the image under display distinguishably, the ultrasonic motor includes:
- a piezoelectric element which generates an ultrasonic vibration when a predetermined drive voltage is applied;
- a stator which is vibrated by the ultrasonic vibration of the piezoelectric element;
- a rotor which is arranged between the stator and the rotary operation device so as to touch the stator and rotates by a progressive wave transmitted from the stator, wherein
- the rotor is in contact with the rotary operation device so that a center of the rotor agrees with a center of the rotary operation device.

2. The rotary input device according to claim 1, further comprising:
- a detection section to detect a depression of the rotary operation device in an axial direction;

wherein
- the detection section can detect a depressed position of the rotary operation device, and
- the scroll instructing section instructs a scrolling direction of the image under display on the basis of the depressed position of the rotary operation device detected by the detection section.

3. The rotary input device according to claim 1, wherein the force sense presenting section changes the way of presenting the force sense in order that the operator can perceive the display position distinguishably as the display position of the image under display to a display area changes by scrolling.

4. The rotary input device according to claim 1, wherein
- when the image under display gets out of the display area by the scrolling, the scroll instructing section instructs scrolling of the image under display in a direction reverse to that of the scrolling; and
- when the image under display gets out of the display area by the scrolling, the force sense presenting section presents the force sense.

5. The rotary input device according to claim 1, wherein the force sense presenting section changes the way of presenting the force sense in order that the operator can perceive the display magnification ratio distinguishably as the display magnification ratio of the image under display changes.

6. The rotary input device according to claim 1, wherein the force sense presenting section presents the force sense by a combination of applying the rotary force in a reverse rotation direction to the rotary operation device and stopping applying the rotary force when the rotary operation device rotates to the one side in a state in which the display magnification ratio of the image under display has reached an upper limit and/or when the rotary operation device rotates to the other side in a state in which the display magnification ratio of the image under display has reached a lower limit, by a change of the display magnification ratio.

7. The rotary input device according to claim 2, wherein
- the detection section can detect a depression force at the time of the depression of the rotary operation device, and
- the scroll instructing section instructs the scrolling of the image under display at a scrolling speed according to a magnitude of the detection force detected by the detection section.

8. Electronic equipment, comprising:
the rotary input device according to claim 1; and
the display section.

* * * * *